United States Patent
Kim et al.

(10) Patent No.: US 7,117,381 B2
(45) Date of Patent: Oct. 3, 2006

(54) CONTROL SIGNAL GENERATION CIRCUIT AND DATA TRANSMISSION CIRCUIT HAVING THE SAME

(75) Inventors: Jae-kwan Kim, Sungnam (KR); Jung-hwan Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 10/750,896

(22) Filed: Jan. 5, 2004

(65) Prior Publication Data

US 2004/0184308 A1 Sep. 23, 2004

(30) Foreign Application Priority Data

Jan. 6, 2003 (KR) .................. 10-2003-0000639

(51) Int. Cl.
*G06F 1/04* (2006.01)
(52) U.S. Cl. .................. 713/400; 713/500; 713/600
(58) Field of Classification Search ........ 713/400–501, 713/503, 600
See application file for complete search history.

(56) References Cited

U.S. PATENT DOCUMENTS

| 4,607,348 A | * | 8/1986 | Sheth ........................ 710/57 |
| 5,822,571 A | * | 10/1998 | Goodrum et al. ........... 713/400 |
| 6,055,590 A | * | 4/2000 | Pettey et al. .................. 710/56 |
| 6,178,525 B1 | * | 1/2001 | Warren ........................ 714/37 |

* cited by examiner

*Primary Examiner*—Dennis M. Butler
(74) *Attorney, Agent, or Firm*—Volentine Francos & Whitt, PLLC

(57) ABSTRACT

A data transmission circuit includes a control signal generation circuit, a write state machine, a conversion circuit, a read state machine, and a selection circuit. The control signal generation circuit receives a strobe signal and a clock signal in response to an enable signal, generates a write control signal that is activated in response to a rising edge of the strobe signal, and generates a read control signal that is activated in response to a first rising or falling edge of the clock signal after the write control signal is activated. The write state machine is activated in response to the write control signal, changes its internal state in synchronization with the strobe signal, and sequentially outputs input control signals in response to the changed internal state. The conversion circuit converts serial data to parallel data in response to the input control signal sequentially output from the write state machine and latches the parallel data. The read state machine is activated in response to the read control signal, changes its internal state in synchronization with the clock signal, and sequentially outputs output control signals in response to the changed internal state. The selection circuit outputs the parallel data latched in the conversion circuit in the same order that the serial data is sequentially input to the conversion circuit in response to the output control signals sequentially output from the read state machine.

19 Claims, 8 Drawing Sheets

FIG. 5

| LEAD | DELAY (BIT TIME) | s1 | s01 | s02 | s0 | rresetnn | SELECT |
|------|------------------|----|----|----|----|----------|--------|
| wclk | 0~1 | 0 | 1 | 0 | 1 | r2 | FALLING EDGE |
| wclk | 1~2 | 0 | 0 | 0 | 0 | r1 | RISING EDGE |
| rclk | 0~1 | 1 | 1 | 0 | 1 | r3 | RISING EDGE |
| rclk | 1~2 | 1 | 1 | 1 | 0 | r4 | FALLING EDGE |

CONTROL SIGNAL GENERATION CIRCUIT AND DATA TRANSMISSION CIRCUIT HAVING THE SAME

BACKGROUND OF THE INVENTION

1. Field of the Invention

The present invention relates to a data transmission circuit of a semiconductor device, and more particularly, the present invention relates to a control signal generation circuit which generates control signals used for data write and/or read operations, a data transmission circuit containing the control signal generation circuit, and a method of transmitting data.

A claim of priority under 35 U.S.C. §119 is made to Korean Patent Application No. 2003-639, filed 6 Jan. 2003, the contents of which are hereby incorporated by reference in its entirety as if fully set forth therein.

2. Description of the Related Art

When a semiconductor system receives input data from an external source, it is typically supplied with a strobe signal indicative of a start of the data and a sampling time. If a time gap exists between the strobe signal and a clock signal with which the semiconductor system operates, a receiving circuit is needed to compensate for the time gap so as to securely receive the externally supplied input data. This time gap can occur between semiconductor systems which operate with the same clock signal and semiconductor systems which operate with different clock signals.

Also, even though they are synchronized with the same clock signal, a time gap also occurs between the strobe signal and the data as a result of delays in data paths, packages or sockets. Thus, a compensation circuit is needed to prevent the time gap from causing the semiconductor system to operate abnormally. The compensation circuit samples externally supplied input data in synchronization with the strobe signal and increases a bit time of the sampled data using a parallel latch or a flip-flop. Thereafter, the compensation circuit samples the sampled data again using an internal clock signal and outputs re-sampled data. Here, the bit time amounts to half of one period of the internal clock signal.

While the compensation circuit can maintain the sample time and hold time by increasing the bit time of the sampled data, a latency is introduced when data is sampled. That is, the compensation circuit creates an undesired latency between data input and output, which in turn increases a data access time of the semiconductor system.

SUMMARY OF THE INVENTION

The present invention provides a control signal generation circuit which generates a control signal used to reduce latency between data input and data output, and a data transmission circuit having the control signal generation circuit.

The present invention also provides a method of transmitting data which allows for a reduction in latency between data input and data output.

According to an aspect of the present invention, there is provided a data transmission circuit which includes a control generation circuit, a write state machine, a conversion circuit, a read state machine, and a selection circuit. The control signal generation circuit receives a strobe signal and a clock signal, generates a write control signal that is activated in response to the strobe signal, and generates a read control signal that is activated in response to a first rising or falling edge of the clock signal after the write control signal is activated. The write state machine is activated in response to the write control signal, internally synchronizes with the strobe signal, and sequentially outputs a plurality of input control signals. The conversion circuit latches serial input data at a timing of the input control signals to converts the input serial data into parallel latched data. The read state machine is activated in response to the read control signal, internally synchronizes with the clock signal, and sequentially outputs a plurality of output control signals. The selection circuit selects the parallel latched data in response to the output control signals, and which outputs the selected data as serial output data which has the same data order as the serial input data.

According to another aspect of the present invention, there is provided a control signal generation circuit which includes a first input terminal which receives a strobe signal, a second input terminal which receives a clock signal, a control terminal which receives an enable signal, a first output terminal which outputs a write control signal, a second output terminal which outputs a read control signal, and a third output terminal which outputs a selection signal. The control signal generation circuit is configured to receive the strobe signal and the clock signal in response to the enable signal being activated, to generate the write control signal that is activated in response to the strobe signal, to generate the read control signal that is activated in response to a first rising or falling edge of the clock signal after the write control signal is activated, to compare a phase of the strobe signal with a phase of the clock signal, and to output the selection signal according to a result of the phase comparison.

According to yet another aspect of the present invention, there is provided a data transmission circuit which includes a control generation circuit, a write state machine, a conversion circuit, a read state machine, and a selection circuit. The control signal generation circuit which includes a first input terminal which receives a strobe signal, a second input terminal which receives a clock signal, a control terminal which receives an enable signal, a first output terminal which outputs a write control signal, a second output terminal which outputs a read control signal, and a third output terminal which outputs a selection signal. Further, the control signal generation circuit is configured to receive the strobe signal and the clock signal in response to the enable signal being activated, to generate the write control signal that is activated in response to the strobe signal, to generate the read control signal that is activated in response to a first rising or falling edge of the clock signal after the write control signal is activated, to compare a phase of the strobe signal with a phase of the clock signal, and to output the selection signal according to a result of the phase comparison. The write state machine is activated in response to the write control signal, internally synchronizes with the strobe signal, and sequentially outputs a plurality of input control signals. The conversion circuit latches serial input data at a timing of the input control signals to converts the input serial data into parallel latched data. The read state machine is activated in response to the read control signal, internally synchronizes with a rising or falling edge of the clock signal based on the selection signal, and sequentially outputs a plurality of output control signals. The selection circuit selects the parallel latched data in response to the output control signals, and which outputs the selected data as serial output data which has the same data order as the serial input data.

According to yet another aspect of the present invention, there is provided a method of transmitting data, the method includes receiving a strobe signal and a clock signal in response to an enable signal, generating a write control signal that is activated in response the strobe signal, and generating a read control signal that is activated in response to a first rising or falling edge of the clock signal which occurs after the write control signal is activated; internally synchronizing, in response to the write control signal, with the strobe signal and sequentially outputting input control signals; latching serial input data at a timing of the input control signals to converts the input serial data into parallel latched data; internally synchronizing, in response to the read control signals, with the clock signal and sequentially outputting output control signals; and selecting the parallel latched data in response to the output control signals, and outputting the selected data as serial output data which has the same data order as the serial input data.

According to yet another aspect of the present invention, there is provided a method of transmitting data, the method including receiving a strobe signal and a clock signal in response to an enable signal, generating a write control signal that is activated in response the strobe signal, and generating a read control signal that is activated in response to a first rising or falling edge of the clock signal which occurs after the write control signal is activated, comparing a phase of the strobe signal with a phase of the clock signal, and outputting a selection signal according to result of the phase comparison; internally synchronizing, in response to the write control signal, with the strobe signal and sequentially outputting input control signals; latching serial input data at a timing of the input control signals to converts the input serial data into parallel latched data; internally synchronizing, in response to the read control signals, with a rising or falling edge of the clock signal based on the selection signal and sequentially outputting output control signals; and selecting the parallel latched data in response to the output control signals, and outputting the selected data as serial output data which has the same data order as the serial input data.

BRIEF DESCRIPTION OF THE DRAWINGS

The above and other features and advantages of the present invention will become more apparent by describing in detail exemplary embodiments thereof with reference to the attached drawings, in which:

FIG. 5 is a table for showing an operation of the control signal generation circuit of the data transmission circuit according to the second embodiment of the present invention;

DETAILED DESCRIPTION OF THE INVENTION

Figure 1:
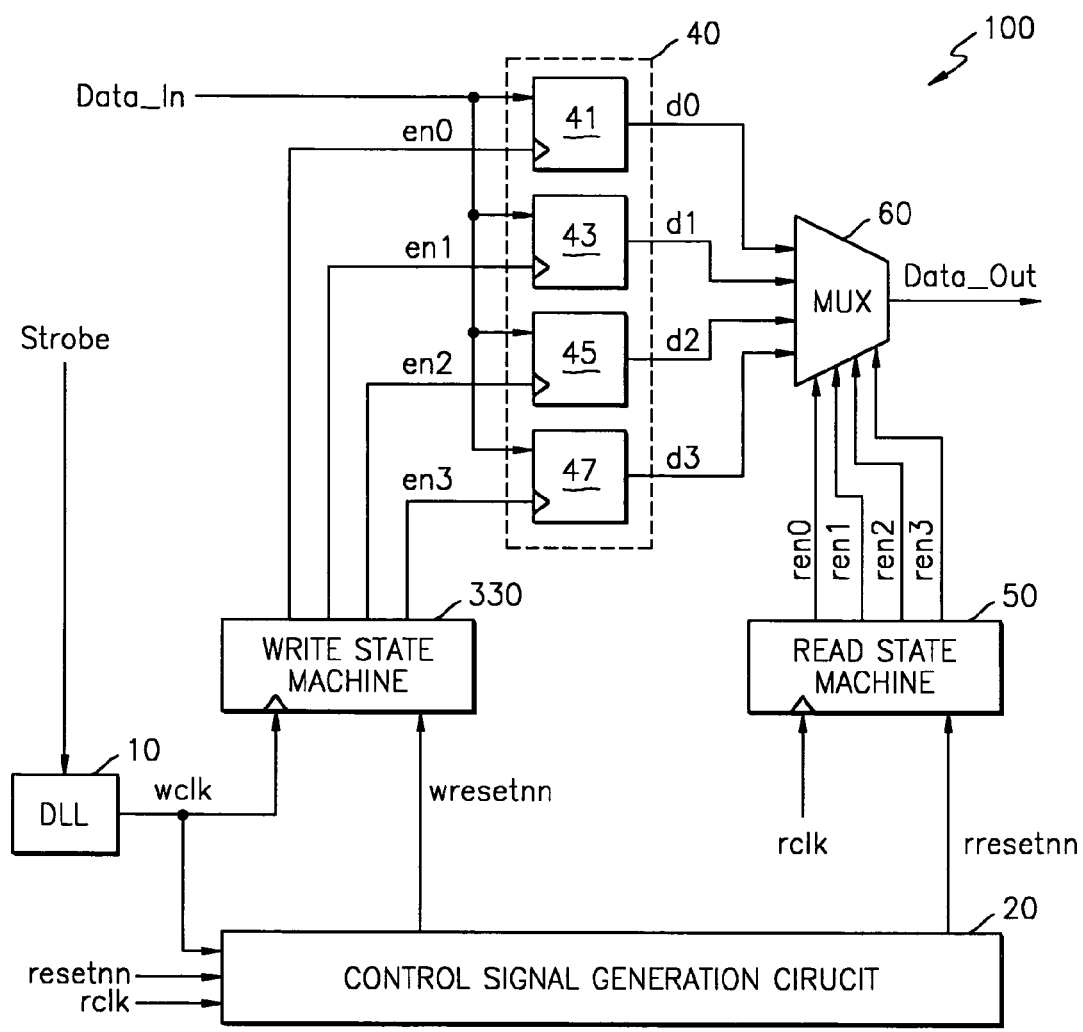
FIG. 1 is a block diagram of a data transmission circuit according to a first embodiment of the present invention.

The present invention will now be described more fully with reference to the accompanying drawings, in which preferred embodiments of the invention are shown. This invention may, however, be embodied in various forms and should not be construed as being limited to the embodiments set forth herein. Rather, these embodiments are provided so that this disclosure will be thorough and complete and will fully convey the scope of the invention to those skilled in the art. In the drawings, the forms of elements are exaggerated for clarity. To facilitate understanding, identical reference numerals have been used, where possible, to designate identical elements that are common to the figures.

FIG. 1 is a block diagram of a data transmission circuit 100 according to a first embodiment of the present invention. Referring to FIG. 1, the data transmission circuit 100 is configured as a kind of input buffer having an input pipeline structure, and includes a delay locked loop (DLL) 10, a control signal generation circuit 20, a write state machine 30, a conversion circuit 40, a read state machine 50, and a selection circuit (MUX) 60.

Figure 4:
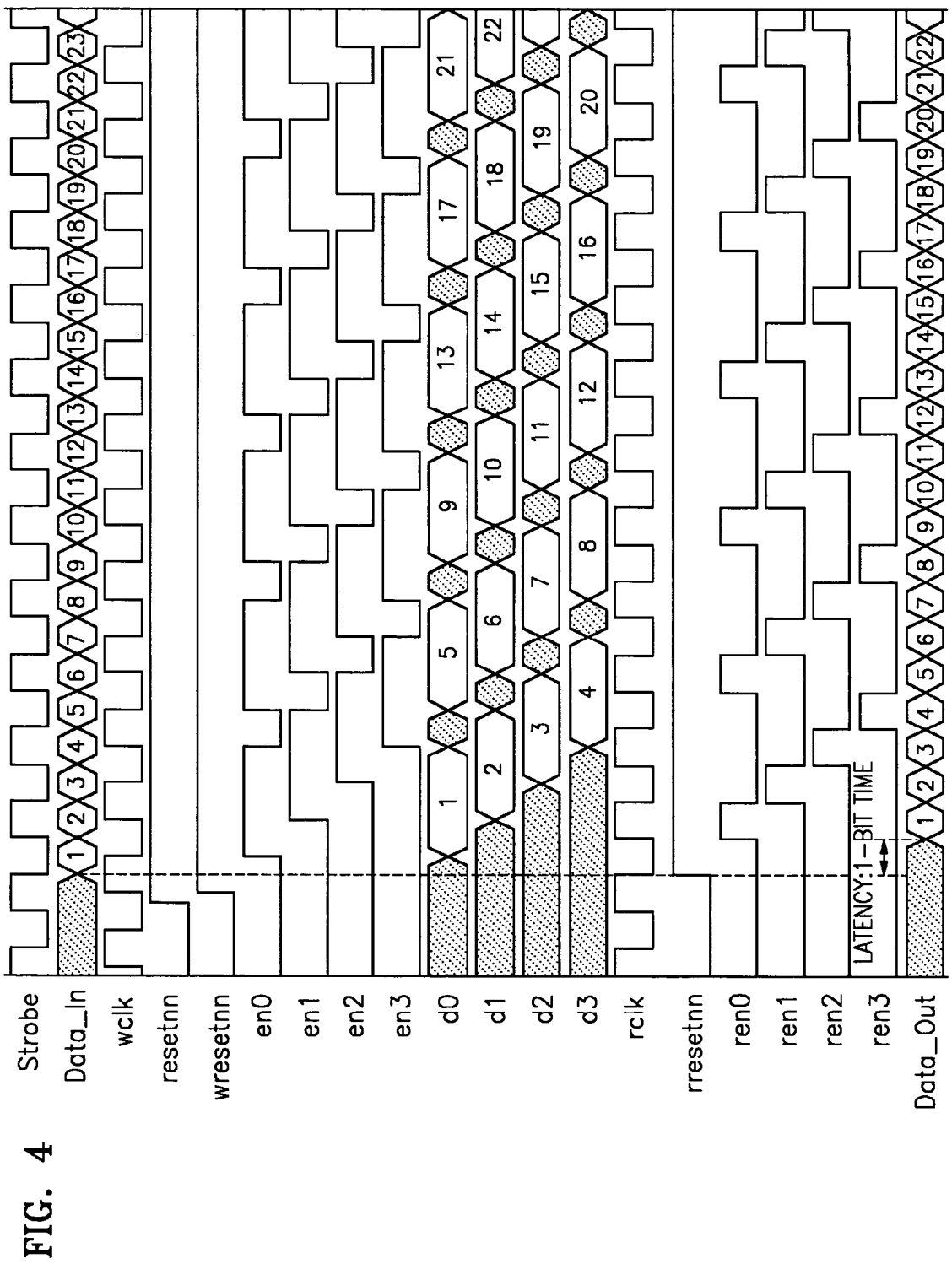
FIG. 4 is a timing diagram of operations of the data transmission circuits according to first and second embodiments of the present invention.

FIG. 4 is a timing diagram of an operation of the data transmission circuit 100 according to the first embodiment of the present invention. Hereinafter, the operation of the data transmission circuit 100 will be described with reference to FIGS. 1 and 4.

The DLL 10 receives a strobe signal Strobe and outputs an internal strobe signal 'wclk' having a phase difference of 90° relative to the strobe signal Strobe. The internal strobe signal 'wclk' is applied to the control signal generation circuit 20 and the write state machine 30.

When input data Data_In is sampled, the internal strobe signal 'wclk' is used as a clock signal of the write state machine 30 so as to obtain maximal setup time and hold time.

The control signal generation circuit 20 receives the internal strobe signal 'wclk' and an internal clock signal 'rclk' in response to an enable signal 'resetnn', generates a write control signal 'wresetnn' that is activated in response to a rising edge of the internal strobe signal 'wclk', and generates a read control signal 'rresetnn' that is activated in response to an initial rising or falling edge of the internal clock signal 'rclk' after the write control signal 'wresetnn' is activated.

The read state machine 30 is activated in response to the write control signal 'wresetnn', changes sequentially its internal state in synchronization with the rising and falling edge of the internal strobe signal 'wclk', and sequentially outputs input control signals en0, en1, en2, and en3 to the conversion circuit 40 in response to the sequentially changed internal state.

The conversion circuit 40, which includes a plurality of flip-flops 41, 43, 45, and 47, sequentially latches serial input data Data_In in response to the input control signals en0, en1, en2, and en3 sequentially output from the write state machine 30. In this manner, the conversion circuit converts the serial input data DATA_IN into parallel data d0, d1, d2, and d3.

Also, each of the plurality of flip-flops 41, 43, 45, and 47 sequentially latches the serial input data Data_In for a time corresponding to the input control signals en0, en1, en2, and en3. Therefore, bit times of the output data d0, d1, d2, and d3 are increased by the plurality of flip-flops 41, 43, 45, and 47.

As a result of the increase in the bit times, it is possible to stably sample the serial input data Data_In even where there is a time gap between the strobe signal Strobe and the internal clock signal 'rclk', thereby preventing a loss of the serial input data Data_In. Thus, the conversion circuit 40 is one example of a serial to parallel data converter.

The read state machine 50 is activated in response to the read control signal 'rresetnn' so as to change its internal state in synchronization with a rising and falling edge of the internal clock signal 'rclk', and sequentially outputs output control signals ren0, ren1, ren2, and ren3 to the selection circuit 60 in response to the sequentially changed internal state.

The selection circuit (MUX) 60 sequentially outputs the output data d0, d1, d2, and d3 that are latched in the conversion circuit 40 in response to the output control signals ren0, ren1, ren2, and ren3 sequentially output from the read state machine 50 in the same order that the serial input data Data_In is sequentially input to the conversion circuit 40. In other words, the selection circuit (MUX) 60 sequentially outputs the output data d0, d1, d2, and d3 of the plurality of flip-flops 41, 43, 45, and 47 as parallel output data Data_Out in response the output control signals ren0, ren1, ren2, and ren3.

The write control signal 'wresetnn' is activated at all times before the read control signal 'rresetnn' is activated. Therefore, the read state machine 50 cannot read data from the conversion circuit 40 before the serial input data Data_in are written to the conversion circuit 40.

Figure 2:
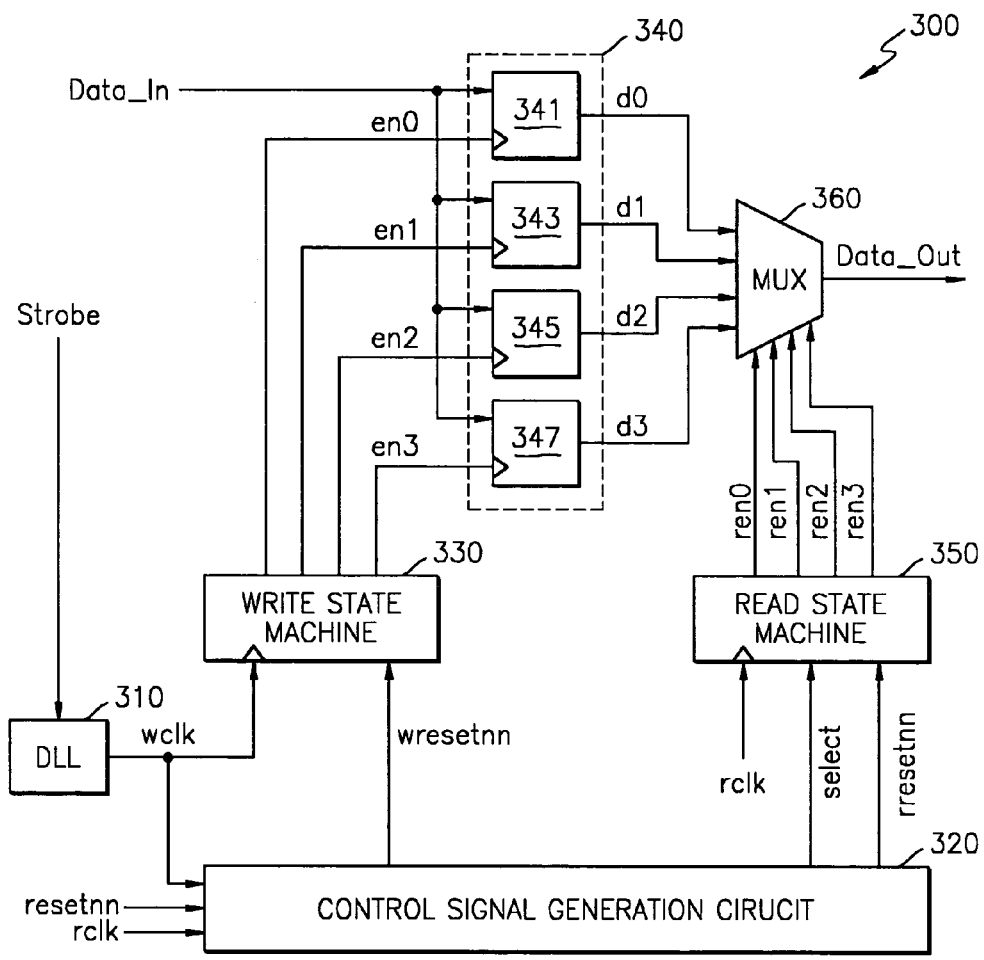
FIG. 2 is a block diagram of a data transmission circuit according to a second embodiment of the present invention.

FIG. 2 is a block diagram of a data transmission circuit 300 according to a second embodiment of the present invention. The configuration and operation of the data transmission circuit 300 of FIG. 2 are similar to those of the data transmission circuit 100 of FIG. 1 except that a control signal generation circuit 320 of FIG. 2 outputs a selection signal 'select' to a read state machine 350, and the read state machine 350 operates with the selection signal 'select'. That is, the configurations and operations of a delay locked loop (DLL) 310, a write state machine 330, a conversion circuit 340, and a selection circuit 360 of FIG. 2 are respectively similar to the DLL 10, the write state machine 30, the conversion circuit 40, and the selection circuit 60 of FIG. 1.

Hereinafter, the operation of the data transmission circuit 300 will be described with reference to FIGS. 2 and 4.

The control signal generation circuit 320 receives an internal strobe signal 'wclk' and an internal clock signal 'rclk' in response to an enable signal 'resetnn', generates a write control signal 'wresetnn' that is activated in response to a rising edge of the internal strobe signal 'wclk', generates a read control signal 'rresetnn' in response to an initial rising or falling edge of the internal clock signal 'rclk' after the write control signal 'wresetnn' is activated, compares a phase of the internal strobe signal 'wclk' with a phase of the internal clock signal 'rclk', and outputs a selection signal 'select' according to the compared result to the read state machine 350.

The selection signal 'select' is used to select an edge of the internal clock signal 'rclk' to be used first by the read state machine 350. That is, the read state machine 350 is activated in response to the read control signal 'rresetnn', sequentially changes its internal state in synchronization with a rising or falling edge of the internal clock signal 'rclk', which is determined based on the logic (high or low) of the selection signal 'select', and sequentially outputs output control signals ren0, ren1, ren2, and ren3 to the selection circuit 360 in response to the sequentially changed internal state.

Figure 3:
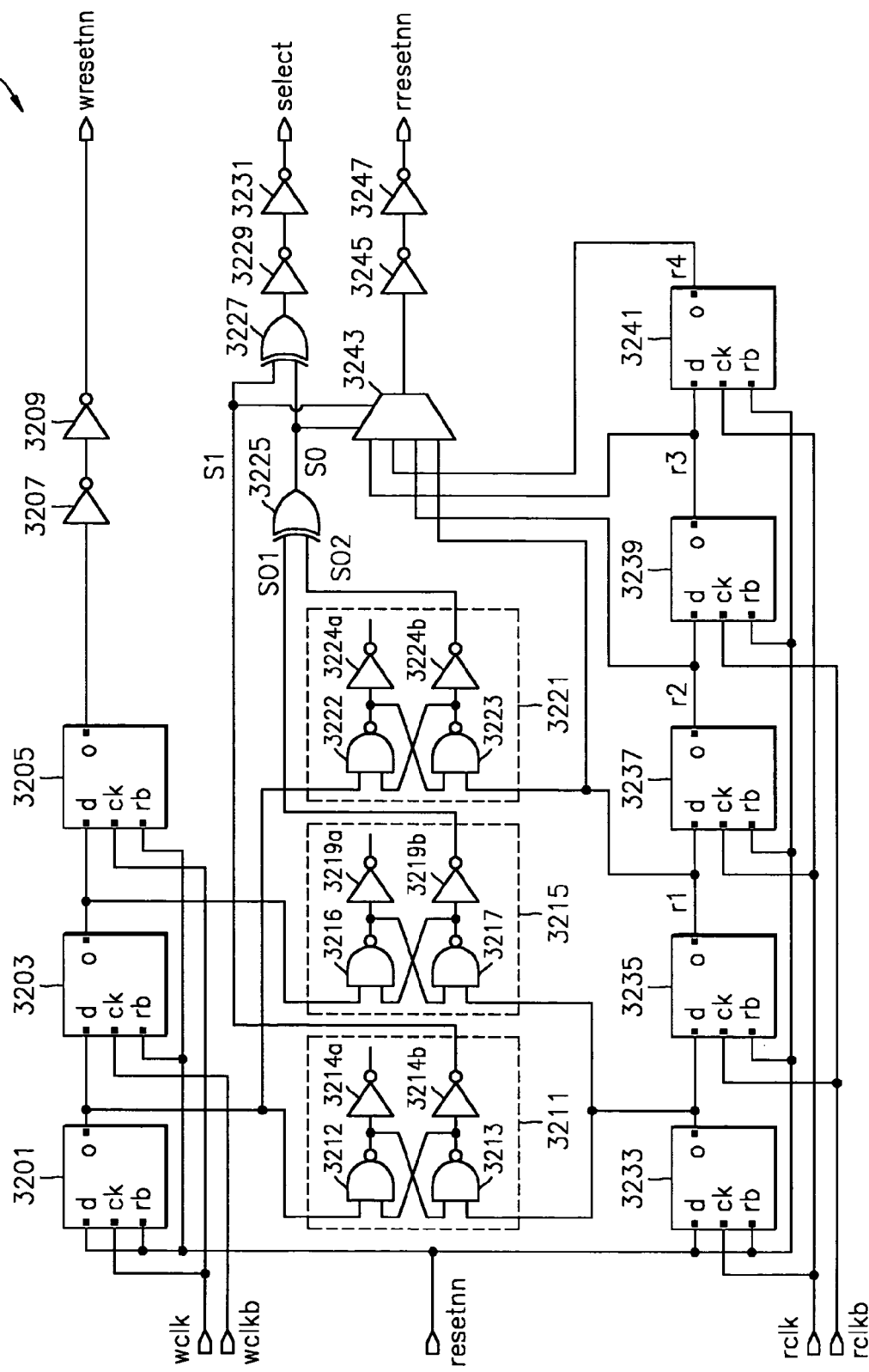
FIG. 3 is a circuit diagram of a control signal generation circuit of FIG. 2.

FIG. 3 is a circuit diagram of the control signal generation circuit 320 of FIG. 2. Referring to FIG. 3, the control signal generation circuit 320 includes a plurality of flip-flops 3201, 3203, 3205, 3233, 3235, 3237, 3239, and 3241, a plurality of latches 3211, 3215, and 3221, two exclusive OR (XOR) gates 3225 and 3227, and a multiplexer 3243. The control signal generation circuit 320 further includes a plurality of inverters 3207, 3209, 3229, 3231, 3245, and 3247.

The enable signal 'resetnn' is input to each reset terminal 'rb' of the plurality of flip-flops 3201, 3203, 3205, 3233, 3235, 3237, 3239, and 3241. If the enable signal 'resetnn' transits from high to low, the plurality of flip-flops 3201, 3203, 3205, 3233, 3235, 3237, 3239, and 3241 are reset.

The enable signal 'resetnn' is input to each input terminal 'd' of the flip-flops 3201 and 3233. The internal strobe signal 'wclk' is input to each clock terminal 'ck' of the flip-flops 3201 and 3205. A complementary internal strobe signal 'wclkb' is input to a clock terminal 'ck' of the flip-flop 3203. The internal strobe signal 'wclk' and the complementary internal strobe signal 'wclkb' are complementary to one another.

An output terminal 'o' of the flip-flop 3201 is connected to an input terminal 'd' of the flip-flop 3203. The output terminal 'o' of the flip-flop 3203 is connected to the input terminal 'd' of the flip-flop 3205. The output terminal 'o' of the flip-flop 3205 is connected to an input terminal of the inverter 3207. The inverter 3209 inverts an output signal of the inverter 3207 and outputs the inverted output signal as the write control signal 'wresetnn' to the write state machine 330.

The internal clock signal 'rclk' is input to each clock terminal 'ck' of the flip-flops 3233, 3237, and 3241. A complementary internal clock signal 'rclkb' is input to each clock terminal 'ck' of the flip-flops 3255 and 3239. The internal clock signal 'rclk' and the complementary internal clock signal 'rclkb' are complementary to one another.

Each input terminal 'd' of the flip-flops 3235, 3237, 3239, and 3241 is connected to each output terminal 'o' of the flip-flops 3233, 3235, 3237, and 3239.

The latch 3211 may be a set-reset (S-R) latch including two NAND gates 3212 and 3213 and two inverters 3214a and 3214b. Hereinafter, the latch 3211 will be referred to as the S-R latch 3211.

The NAND gate 3212 has a first input terminal connected to the output terminal 'o' of the flip-flop 3201 and a second input terminal connected to an output terminal of the NAND gate 3213. The NAND gate 3213 has a first input terminal connected to the output terminal of the NAND gate 3212 and a second input terminal connected to the output terminal 'o' of the flip-flop 3233. The inverter 3214 is connected between the output terminal of the NAND gate 3213 and a first input terminal of the XOR gate 3227.

The latch 3215 may be an S-R latch including two NAND gates 3216 and 3217 and two inverters 3219a and 3219b. Hereinafter, the latch 3215 will be referred to as the S-R latch 3215.

The NAND gate 3216 has a first input terminal connected to the output terminal 'o' of the flip-flop 3203 and a second input terminal connected to an output terminal of the NAND gate 3217. The NAND gate 3217 has a first input terminal connected to an output terminal of the NAND gate 3216 and a second input terminal connected to the output terminal 'o' of the flip-flop 3233. The inverter 3219 is connected between the output terminal of the NAND gate 3217 and a first input terminal of the XOR gate 3225.

The latch 3221 may be an S-R latch including two NAND gates 3222 and 3223 and two inverters 3224a and 3224b. Hereinafter, the latch 3221 will be referred to as the S-R latch 3221.

The NAND gate 3222 has a first input terminal connected to the output terminal 'o' of the flip-flop 3201 and a second input terminal connected to an output terminal of the NAND gate 3223. The NAND gate 3223 has a first input terminal connected to an output terminal of the NAND gate 3222 and a second input terminal connected to the output terminal 'o' of the flip-flop 3235. The inverter 3224 is connected between the output terminal of the NAND gate 3223 and a second input terminal of the XOR gate 3225.

In response to an output signal S1 of the latch 3211 and an output signal S0 of the XOR gate 3225, the multiplexer 3243 selectively outputs one of output signals r1, r2, r3, and r4 of the flip-flops 3235, 3237, 3239, and 3241. The inverter 3247 inverts an output signal of the inverter 3245 and outputs the inverted output signal as the read control signal 'rresetnn' to the read state machine 350.

The XOR gate 3227 receives the output signal S1 of the latch 3211 and the output signal S0 of the XOR gate 3225, performs an XOR operation on the output signals S1 and S0, and outputs the result to the inverter 3299. The inverter 3231 inverts an output signal of the inverter 3229 and outputs the inverted output signal as the selection signal 'select' to the read state machine 350.

FIG. 5 is a table for showing an operation of the control signal generation circuit 320 of the data transmission circuit 300 according to the second embodiment of the present invention. A "lead" of FIG. 5 indicates a signal which is activated first after the enable signal 'resetnn' is activated. Thus, if the internal strobe signal 'wclk' corresponds to the lead, it is activated before the internal clock signal 'rclk' is activated. A bit time amounts to half of one period of the internal strobe signal 'wclk'.

Figure 7:
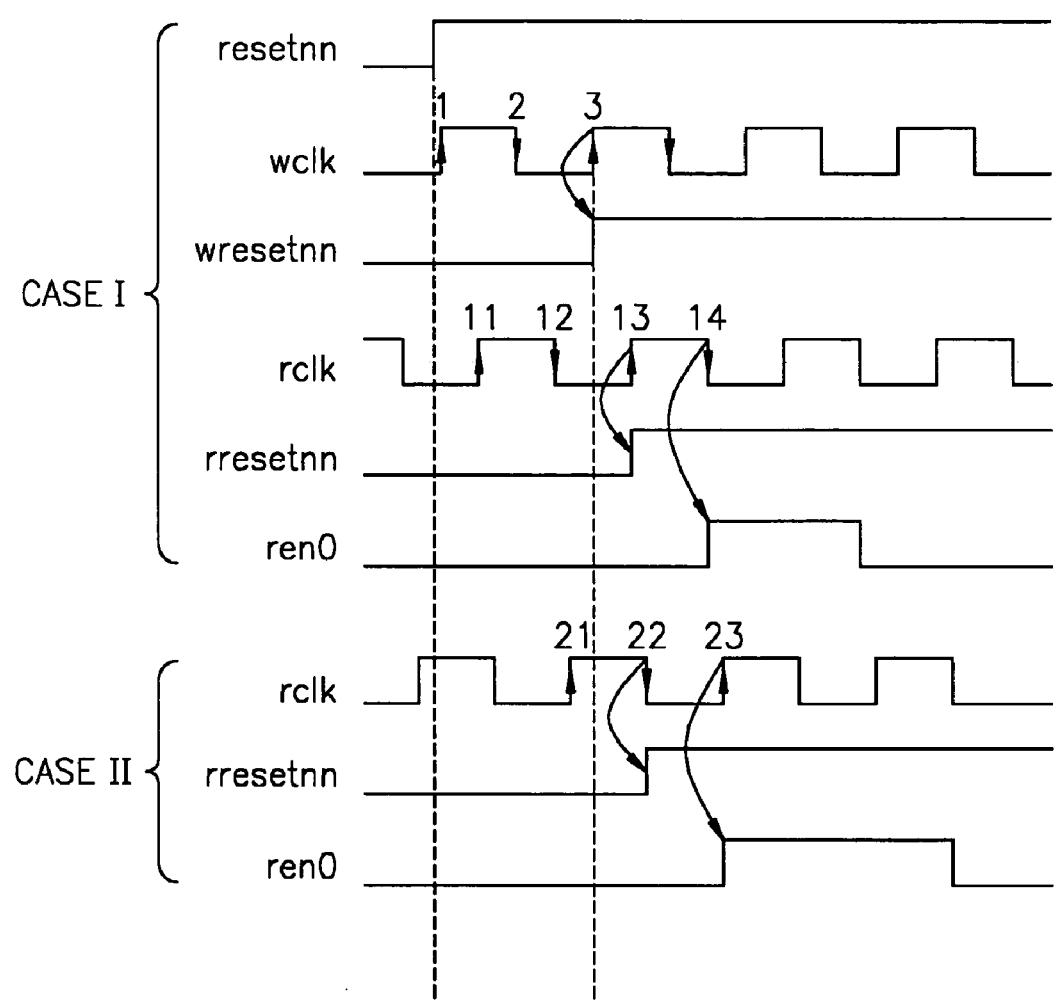
FIG. 7 is a timing diagram for showing time points when an enable signal input to a read state machine is activated and when the read state machine operates for the first time, in the case where a phase of an internal strobe signal leads an internal clock signal.

FIG. 7 is a timing diagram for showing time points when the enable signal 'resetnn' input to the read state machine 350 is activated and when the read state machine 350 operates for the first time, if a phase of the internal strobe signal 'wclk' leads the internal clock signal 'rclk'.

Hereinafter, with reference to FIGS. 3, 5, and 7, activation timings of the write control signal 'wresetnn', the read control signal 'rresetnn', and the selection signal 'select' will be described in a Case I of FIG. 7 in which the phase of the internal strobe signal 'wclk' leads the phase of the internal clock signal 'rclk' by 0–1 bit time.

The flip-flop 3205 outputs the write control signal 'wresetnn', which is activated in response to a second rising edge 3 of the internal strobe signal 'wclk' after the enable signal 'resetnn' is activated, to the write state machine 330 through the inverters 3207 and 3209 which are serially connected.

The flip-flop 3235 outputs an output signal of the flip-flop 3233 as the output signal r1 in response to a rising edge of the complementary internal clock signal 'rclkb', that is, in response to a first falling edge 12 of the internal clock signal 'rclk'.

The flip-flop 3237 outputs the output signal r1 of the flip-flop 3235 as the output signal r2 in response to a second rising edge 13 of the internal clock signal 'rclk'.

The S-R latch 3211 receives output signals of the flip-flops 3201 and 3233 and outputs the output signal S1 which has a value of '0', that is, which is low. The S-R latch 3215 receives output signals of the flip-flops 3203 and 3233 and outputs an output signal S01 which has a value of '1', that is, which is high. The S-R latch 3221 receives the output signal of the flip-flop 3201 and the output signal r1 of the flip-flop 3235 and outputs an output signal S02 which has a value of '0'.

The XOR gate 3225 receives the output signal S01 of the S-R latch 3215 and the output signal S02 of the S-R latch 3221, performs the XOR operation of the output signals S01 and S02, and outputs the result. In this case, the result, i.e., the output signal S0 of the XOR gate 3225, has a value of '1'.

Table 1 shows the read control signal 'rresetnn' output from the multiplexer 3243 with respect to combinations of the output signal S1 of the S-R latch 3211 and the output signal S0 of the XOR gate 3225.

TABLE 1

| S0 | S1 | rresetnn | select |
|---|---|---|---|
| 0 | 0 | r1 | 0 |
| 0 | 1 | r2 | 1 |
| 1 | 1 | r3 | 0 |
| 1 | 0 | r4 | 1 |

Thus, the multiplexer 3243 outputs the output signal r2 of the flip-flop 3237 as the read control signal 'rresetnn' to the read state machine 350.

The XOR gate 3227 receives the output signal S1 of the S-R latch 3211 and the output signal S0 of the XOR gate 3225, performs the XOR operation of the output signals S1 and S0, and outputs the result as the selection signal 'select' to the inverter 3229. The selection signal 'select' is output to the read state machine 350 through the inverters 3229 and 3231. Here, the XOR gate 3227 outputs the selection signal 'select' which has a value of '1, to the read state machine 350.

The control signal generation circuit 320 generates the write control signal 'wresetnn' that is activated in response to the second rising edge 3 of the internal strobe signal 'wclk' after the enable signal 'resetnn' is activated and generates the read control signal 'rresetnn' that is activated in response to a first rising edge 13 of the internal clock signal 'rclk' after the write control signal 'wresetnn' is activated.

The read state machine 350 outputs the output control signal ren0 for the first time in response to a first falling edge of the internal clock signal 'rclk' after the read control signal 'rresetnn' is activated and sequentially outputs the output control signals ren1, ren2, and ren3 to the selection circuit 360 in response to a rising or falling edge of the internal clock signal 'rclk'.

Hereinafter, with reference to FIGS. 3, 5, and 7, activation timings of the write control signal 'wresetnn', the read control signal 'rresetnn', and the selection signal 'select' will be described in a Case II of FIG. 7 in which the phase of the internal strobe signal 'wclk' leads the phase of the internal clock signal 'rclk' by 1–2 bit time(s).

The flip-flop 3205 outputs the write control signal 'wresetnn', which is activated in response to the second rising edge 3 of the internal strobe signal 'wclk' after the enable signal 'resetnn' is activated, to the write state machine 330 through the inverters 3207 and 3209 which are serially connected.

The flip-flop 3235 outputs the output signal of the flip-flop 3233 as the output signal r1 in response to a rising edge of the complementary internal clock signal 'rclkb', that is, a first falling edge 22 of the internal clock signal 'rclk'.

The flip-flop 3237 outputs the output signal r1 of the flip-flop 3235 as the output signal r2 in response to a second rising edge 23 of the internal clock signal 'rclk'.

The latch 3211 receives the output signal of the flip-flop 3201 and the output signal of the flip-flop 3233 and outputs the output signal S1 which has a value of '0'. The latch 3215 receives the output signal of the flip-flop 3203 and the output signal of the flip-flop 3233 and outputs the output signal S01 which has a value of '0'. The S-R latch 3221 receives the output signal of the flip-flop 3201 and the output signal r1 of the flip-flop 3225 and outputs the output signal S02 which has a value of '0'.

The XOR gate 3225 receives the output signal S01 of the S-R latch 3215 and the output signal S02 of the latch 3221, performs the XOR operation on the output signals S01 and S02, and outputs the result as the output signal S0. In this case, the XOR gate 3225 outputs the output signal S0 which has a value of '0'.

According to Table 1, the multiplexer 3243 outputs the output signal r1 of the flip-flop 3235 as the read control signal 'rresetnn' to the read state machine 350. In this case, the XOR gate 3227 outputs the selection signal 'select', which has a value of '0', to the read state machine 350.

The read state machine 350 outputs the output control signal ren0 for the first time in response to a first rising edge 23 of the internal clock signal 'rclk' after the read control signal 'rresetnn' is activated and sequentially outputs the output control signals ren1, ren2, and ren3 to the selection circuit 360 in response to a falling or rising edge of the internal clock signal 'rclk'.

Figure 8:
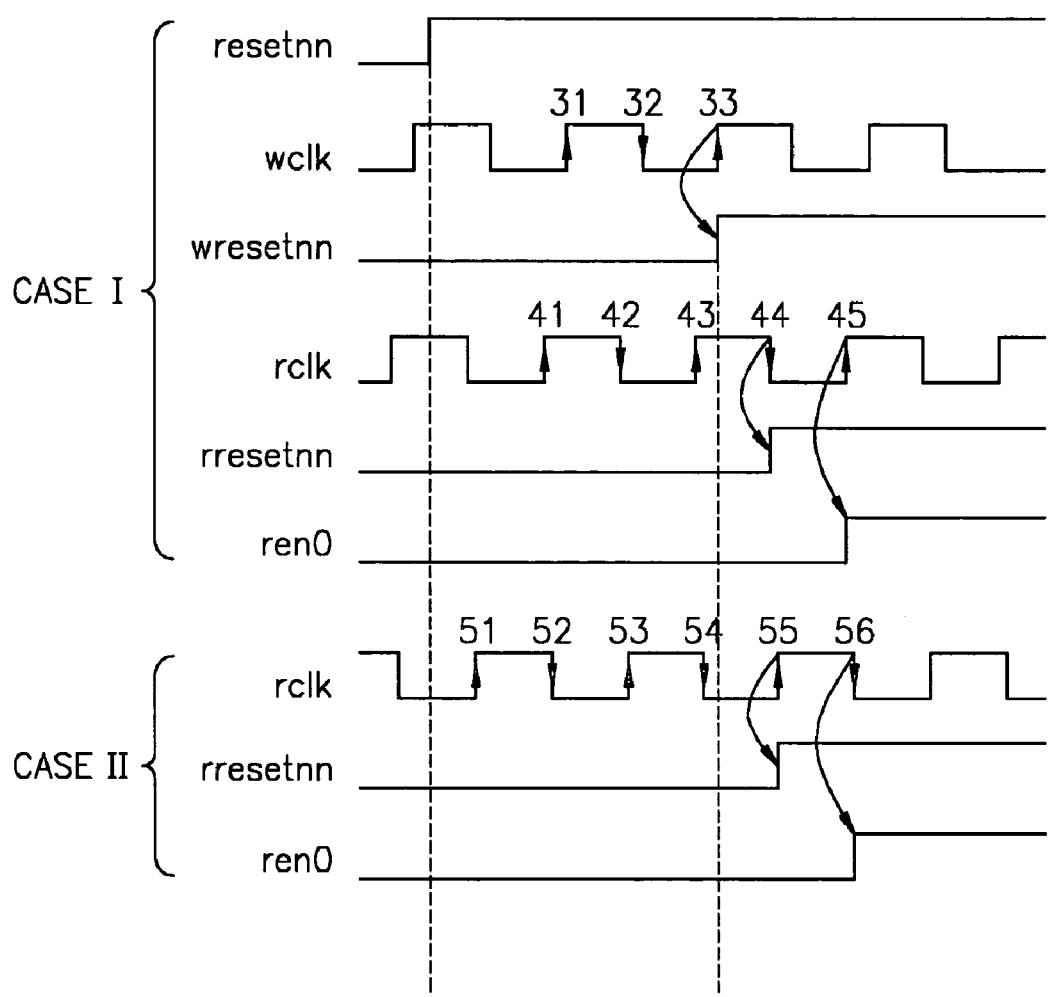
FIG. 8 is a timing diagram for showing time points when the enable signal input to the read state machine is activated and when the read state machine operates for the first time, in the case where the phase of the internal clock signal leads the internal strobe signal.

FIG. 8 is a timing diagram for showing time points when the enable signal 'resetnn' input to the read state machine 350 is activated and when the read state machine 350 operates for the first time, if the phase of the internal clock signal 'rclk' leads the internal strobe signal 'wclk'.

Hereinafter, with reference to FIGS. 3, 5, and 8, activation timing of the write control signal 'wresetnn', the read control signal 'rresetnn', and the selection signal 'select' will be described in a Case I of FIG. 8 when the phase of the internal clock signal 'rclk' leads the phase of the internal strobe signal 'wclk' by 0–1 bit time.

The flip-flop 3205 outputs the write control signal 'wresetnn', which is activated in response to a second rising edge 33 of the internal strobe signal 'wclk' after the enable signal 'resetnn' is activated, to the write state machine 330 through the inverters 3207 and 3209 which are serially connected.

The flip-flop 3235 outputs the output signal of the flip-flop 3233 as the output signal r1 in response to a first rising edge of the complementary internal clock signal 'rclkb', that is, a first falling edge 42 of the internal clock signal 'rclk'.

The flip-flop 3237 outputs the output signal r1 of the flip-flop 3235 as the output signal r2 in response to a second rising edge 43 of the internal clock signal 'rclk'. The flip-flop 3239 outputs the output signal r2 of the flip-flop 3237 as the output signal r3 in response to a rising edge of the complementary internal clock signal 'rclkb' of a second falling edge 44 of the internal clock signal 'rclk'.

The S-R latch 3211 outputs the output signal S1 which has a value of '1'. The S-R latch 3215 outputs the output signal S01 which has a value of '1'. The S-R latch 3221 outputs the output signal S02 which has a value of '0'. The XOR gate 3255 outputs the output signal S0 which has a value of '1'.

The XOR gate 3227 outputs an output signal which has a value of '0'. Therefore, the selection signal 'select' has a value of '0'.

According to Table 1, the multiplexer 3243 outputs the output signal r3 of the flip-flop 3239 as the read control signal 'rresetnn'.

The control signal generation circuit 320 generates the write control signal 'wresetnn' that is activated in response to a first rising edge 31 of the internal strobe signal 'wclk' after the enable signal 'resetnn' is activated and outputs the read control signal 'rresetnn' that is activated in response to a first falling edge 44 of the internal clock signal 'rclk' after the write control signal 'wresetnn' is activated.

The read state machine 350 outputs the output control signal ren0 for the first time in response to a first rising edge 45 of the internal clock signal 'rclk' after the read control signal 'rresetnn' is activated and sequentially outputs the output signals ren1, ren2, and ren3 in response to a falling or rising edge of the internal clock signal 'rclk' to the selection circuit 360.

Hereinafter, with reference to FIGS. 3, 5, and 8, activation timing of the Write control signal 'wresetnn', the read control signal 'rresetnn' and the selection signal 'select' will be described in a case 11 of FIG. 8 in which the phase of the internal clock signal 'rclk' leads the phase of the internal strobe signal 'wclk' by 1–2 bit time(s).

The flip-flop 3205 outputs the write control signal 'wresetnn', which is activated in response to the second rising edge 33 of the internal strobe signal 'wclk' after the enable signal 'resetnn' is activated, to the write state machine 330 through the inverters 3207 and 3209 which are serially connected.

The flip-flop 3235 outputs the output signal of the flip-flop 3233 as the output signal r1 in response to a first rising edge of the complementary internal clock signal 'rclkb', that is, a first falling edge 52 of the internal clock signal 'rclk'.

The flip-flop 3237 outputs the output signal r1 of the flip-flop 3235 as the output signal r2 in response to a second rising edge 53 of the internal clock signal 'rclk'. The flip-flop 3239 outputs the output signal r2 of the flip-flop 3237 as the output signal r3 in response to a rising edge of the complementary internal clock signal 'rclkb' corresponding to a second falling edge 54 of the internal clock signal 'rclk'. The flip-flop 3241 outputs the output signal r3 as the output signal r4 in response to a third rising edge 55 of the internal clock signal 'rclk'.

The S-R latch 3211 outputs the output signal S1 which has a value of '1'. The S-R latch 3215 outputs the output signal S01 which has a value of '1'. The S-R latch 3221 outputs the output signal S02 which has a value of '0'. The XOR gate 3255 outputs the output signal S0 which has a value of '0'. The XOR gate 3227 outputs an output signal which has a value of '1'. Therefore, the selection signal 'select' has a value of '1'.

According to Table 1, the multiplexer 3243 outputs the output signal r4 of the flip-flop 3241 as the read control signal 'rresetnn'.

The control signal generation circuit 320 generates the write control signal 'wresetnn' that is activated in response to a second rising edge 33 of the internal strobe signal 'wclk' after the enable signal 'resetnn' is activated and outputs the read control signal 'rresetnn' that is activated in response to a first falling edge 55 of the internal clock signal 'rclk' after the write control signal 'wresetnn' is activated.

The read state machine 350 outputs the output control signal ren0 for the first time in response to a first rising edge 56 of the internal clock signal 'rclk' after the read control signal 'rresetnn' is activated and sequentially outputs the output signals ren1, ren2, and ren3 in response to a falling or rising edge of the internal clock signal 'rclk' to the selection circuit 360.

Figure 6:
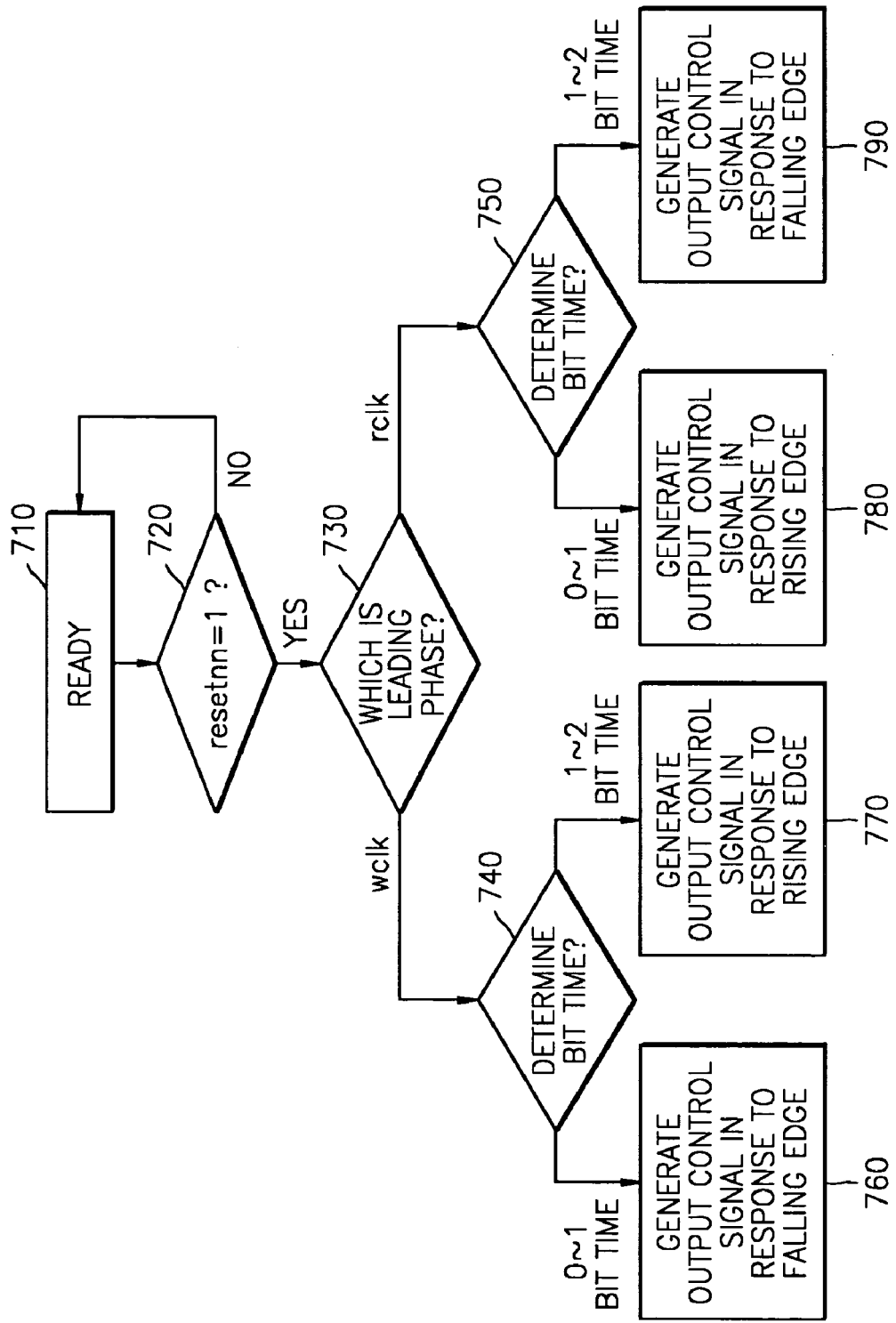
FIG. 6 is a flowchart of the operation of the control signal generation circuit of the data transmission circuit according to the second embodiment of the present invention.

FIG. 6 is a flowchart of the operation of the control signal generation circuit 320 of the data transmission circuit 300 according to the second embodiment of the present invention. Hereinafter, a method of transmitting a control signal according to the present invention will be described with reference to FIGS. 3 through 8.

The control signal generation circuit 320 determines whether the enable signal 'resetnn' is activated in step 720. If the enable signal 'resetnn' is activated, the control signal generation circuit 320 compares the phase of the internal strobe signal 'wclk' with the phase of the internal clock signal 'rclk' in step 730.

If the phase of the internal strobe signal 'wclk' leads the phase of the internal clock signal 'rclk', the control signal generation circuit 320 determines a bit time in step 740. If the phase of the internal strobe signal 'wclk' leads the phase of the internal clock signal 'rclk' by 0–1 bit time, the read state machine 350 generates the output control signal ren0 in response to a first falling edge of the internal clock signal 'rclk' (the first falling edge 14 of FIG. 7) after the read control signal 'rresetnn' is activated (step 760).

If the phase of the internal strobe signal 'wclk' leads the the phase of the internal clock signal 'rclk' by 1–2 bit time, the read state machine 350 generates the output control signal ren0 in response to a first rising edge of the internal clock signal 'rclk' (the first rising edge 23 of FIG. 7) after the read control signal 'rresetnn' is activated (step 770).

However, if the phase of the internal clock signal 'rclk' leads the phase of the internal strobe signal 'wclk', the control signal generation circuit 320 determines a bit time in step 750. If the phase of the internal clock signal 'rclk' leads the phase of the internal strobe signal 'wclk' by 0–1 bit time, the read state machine 350 generates the output control signal ren0 in response to a first rising edge of the internal clock signal 'rclk' (the first rising edge 45 of 8) after the read control signal 'rresetnn' is activated (step 780).

If the phase of the internal clock signal 'rclk' leads the phase of the internal strobe signal 'wclk' by 1–2 bit time (s), the read state machine 350 generates the output control signal ren0 in response to a first falling edge of the internal clock signal 'rclk' (the first falling edge 56 of FIG. 8) after the read control signal 'rresetnn' is activated (step 790).

As described above, a control signal generation circuit according to the present invention generates control signals to minimize latency between data input and output. Accordingly, a data transmission circuit having the control signal generation circuit reduces the time for a semiconductor system to access data according to the generated control signals.

While the present invention has been particularly shown and described with reference to exemplary embodiments thereof, it will be understood by those of ordinary skill in the art that various changes in form and details may be made therein without departing from the spirit and scope thereof as defined by the appended claims.

What is claimed is:

1. A data transmission circuit comprising:
 a control signal generation circuit, which receives a strobe signal and a clock signal, which generates a write control signal that is activated in response to the strobe signal, and which generates a read control signal that is activated in response to a first rising or falling edge of the clock signal after the write control signal is activated;
 a write state machine which is activated in response to the write control signal, which internally synchronizes with the strobe signal, and which sequentially outputs a plurality of input control signals;
 a conversion circuit which latches serial input data at a timing of the input control signals to converts the input serial data into parallel latched data;
 a read state machine which is activated in response to the read control signal, which internally synchronizes with the clock signal, and which sequentially outputs a plurality of output control signals; and
 a selection circuit which selects the parallel latched data in response to the output control signals, and which outputs the selected data as serial output data which has the same data order as the serial input data.

2. The data transmission circuit of claim 1, wherein the conversion circuit includes a plurality of flip-flops which respectively receive the input control signals, wherein each of the plurality of flip-flops latches the serial data in response to a respective input control signal.

3. The data transmission circuit of claim 1, wherein read state machine initiates internal synchronization with the clock signal in response to the first rising or falling edge of the clock signal after the read control signal is activated.

4. The data transmission circuit of claim 1, wherein a latency of the output serial data relative to the input serial data is one data bit period.

5. The data transmission circuit of claim 4, wherein the one data bit period is one-half a period of the clock signal.

6. A control signal generation circuit comprising:
 a first input terminal which receives a strobe signal;
 a second input terminal which receives a clock signal;
 a control terminal which receives an enable signal;
 a first output terminal which outputs a write control signal;
 a second output terminal which outputs a read control signal; and
 a third output terminal which outputs a selection signal, wherein the control signal generation circuit is configured to receive the strobe signal and the clock signal in response to the enable signal being activated, to generate the write control signal that is activated in response to the strobe signal, to generate the read control signal that is activated in response to a first rising or falling edge of the clock signal after the write control signal is activated, to compare a phase of the strobe signal with a phase of the clock signal, and to output the selection signal according to a result of the phase comparison.

7. The control signal generation circuit of claim 6, further comprising:
 a first latch which latches the enable signal in synchronization with the strobe signal;
 a second latch which latches an output signal of the first latch in synchronization with a complementary signal of the strobe signal;
 a third latch which outputs an output signal of the second latch as the write control signal in synchronization with the strobe signal;
 a fourth latch which latches the enable signal in synchronization with the clock signal;
 a fifth latch which latches an output signal of the fourth latch in synchronization with a complementary signal of the clock signal;

a sixth latch which latches an output signal of the fifth latch in synchronization with the clock signal;
a seventh latch which latches an output signal of the sixth latch in synchronization with the complementary signal of the clock signal;
an eighth latch which latches an output signal of the seventh latch in synchronization with the strobe signal;
a first set-reset (S-R) latch which receives the output signals of the first and fourth latches;
a second S-R latch which receives the output signals of the second and fourth latches;
a third S-R latch which receives the output signals of the first and fifth latches;
a first exclusive OR (XOR) gate which receives output signals of the first and third S-R latches;
a second XOR gate which receives output signals of the first S-R latch and the first XOR gate and outputs an XOR operation result of the output signals of the first S-R latch and the first XOR gate as the selection signal; and
a multiplexer which outputs one of the output signals of the fifth through eight latches as the read control signal in response to combinations of the output signals of the first and second XOR gates.

8. A data transmission circuit comprising:
control signal generation circuit comprising (a) a first input terminal which receives a strobe signal, (b) a second input terminal which receives a clock signal, (c) a control terminal which receives an enable signal, (d) a first output terminal which outputs a write control signal, (e) a second output terminal which outputs a read control signal, (f) and a third output terminal which outputs a selection signal, and wherein the control signal generation circuit is configured to receive the strobe signal and the clock signal in response to the enable signal being activated, to generate the write control signal that is activated in response to the strobe signal, to generate the read control signal that is activated in response to a first rising or falling edge of the clock signal after the write control signal is activated, to compare a phase of the strobe signal with a phase of the clock signal, and to output the selection signal according to a result of the phase comparison;
a write state machine which is activated in response to the write control signal, which internally synchronizes with the strobe signal, and which sequentially outputs a plurality of input control signals;
a conversion circuit which latches serial input data at a timing of the input control signals to converts the input serial data into parallel latched data;
a read state machine which is activated in response to the read control signal, which internally synchronizes with a rising or falling edge of the clock signal based on the selection signal, and which sequentially outputs a plurality of output control signals; and
a selection circuit which selects the parallel latched data in response to the output control signals, and which outputs the selected data as serial output data which has the same data order as the serial input data.

9. The data transmission circuit of claim 8, wherein the conversion circuit includes a plurality of flip-flops which respectively receive the input control signals, wherein each of the plurality of flip-flops latches the serial data in response to a respective input control signal.

10. The data transmission circuit of claim 8, wherein a latency of the output serial data relative to the input serial data is one data bit period.

11. The data transmission circuit of claim 10, wherein the one data bit period is one-half a period of the clock signal.

12. A data transmission circuit comprising:
a control signal generation circuit which receives a strobe signal and a clock signal in response to an enable signal being activated, which generates a write control signal that is activated in response to the strobe signal, which generates a read control signal that is activated in response to a first rising or falling edge of the clock signal after the write control signal is activated, which compares a phase of the strobe signal with a phase of the clock signal, and which outputs a selection signal according to a result of the phase comparison;
a write state machine which is activated in response to the write control signal, which internally synchronizes with the strobe signal, and which sequentially outputs a plurality of input control signals;
a conversion circuit which latches serial input data at a timing of the input control signals to converts the input serial data into parallel latched data;
a read state machine which is activated in response to the read control signal, which internally synchronizes with a rising or falling edge of the clock signal based on the selection signal, and which sequentially outputs a plurality of output control signals; and
a selection circuit which selects the parallel latched data in response to the output control signals, and which outputs the selected data as serial output data which has the same data order as the serial input data.

13. The data transmission circuit of claim 12, wherein a latency of the output serial data relative to the input serial data is one data bit period.

14. The data transmission circuit of claim 13, wherein the one data bit period is one-half a period of the clock signal.

15. A method of transmitting data, the method comprising:
receiving a strobe signal and a clock signal in response to an enable signal, generating a write control signal that is activated in response the strobe signal, and generating a read control signal that is activated in response to a first rising or falling edge of the clock signal which occurs after the write control signal is activated;
internally synchronizing, in response to the write control signal, with the strobe signal and sequentially outputting input control signals;
latching serial input data at a timing of the input control signals to converts the input serial data into parallel latched data;
internally synchronizing, in response to the read control signals, with the clock signal and sequentially outputting output control signals; and
selecting the parallel latched data in response to the output control signals, and outputting the selected data as serial output data which has the same data order as the serial input data.

16. The method of claim 15, wherein said sequentially outputting the output control signals is characterized by initiating internal synchronization with the clock signal in response to a first rising or falling edge of the clock signal after the read control signal is activated.

17. The method of claim 15, wherein a latency of the output serial data relative to the input serial data is one data bit period.

18. A method of transmitting data, the method comprising:
receiving a strobe signal and a clock signal in response to an enable signal, generating a write control signal that is activated in response the strobe signal, and generating a read control signal that is activated in response to a first rising or falling edge of the clock signal which occurs after the write control signal is activated, comparing a phase of the strobe signal with a phase of the clock signal, and outputting a selection signal according to result of the phase comparison;

internally synchronizing, in response to the write control signal, with the strobe signal and sequentially outputting input control signals;

latching serial input data at a timing of the input control signals to converts the input serial data into parallel latched data;

internally synchronizing, in response to the read control signals, with a rising or falling edge of the clock signal based on the selection signal and sequentially outputting output control signals; and selecting the parallel latched data in response to the output control signals, and outputting the selected data as serial output data which has the same data order as the serial input data.

19. The method of claim 18, wherein a latency of the output serial data relative to the input serial data is one data bit period.

* * * * *